United States Patent Office 3,261,646
Patented July 19, 1966

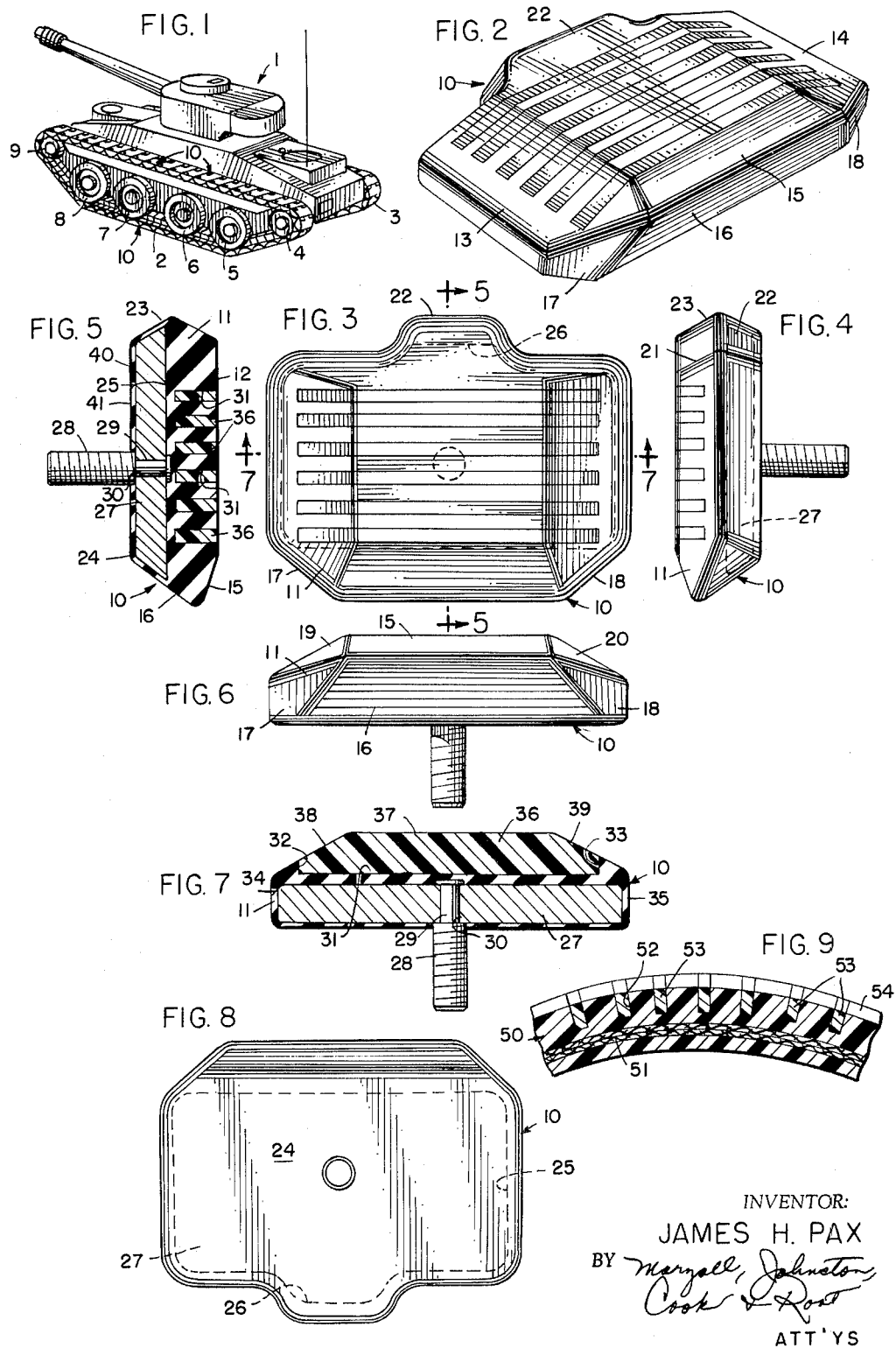

3,261,646
TREAD SURFACES ON ELASTOMER BODIES
James H. Pax, Rudolph, Ohio, assignor to D. S. Brown Company, North Baltimore, Ohio, a corporation of Ohio
Filed June 19, 1964, Ser. No. 376,334
6 Claims. (Cl. 305—35)

This invention, in general, relates to tread surfaces on elastomer bodies such as rubber tires or shoes or cleats for endless track vehicles, especially endless track military vehicles.

Armored tanks and other track-type military vehicles are driven by endless tracks. These endless tracks render the vehicle operational in rough, uneven terrain when necessary under military maneuvers. The vehicle, however, also travels over hard surface roads, and the shoes or cleats for the endless tracks should be of the type which wear well under abrasion and also grip the road surface.

It is a primary object of this invention to provide improvements in tread surfaces on elastomer bodies.

Another object of the invention is to provide improvements in tread surfaces such as those on tires and tank cleats or shoes by providing a tread surface composed of two types of synthetic polymers, one being a hard, wear-resistant elastomer polymer inset in a softer, more flexible, elastomer polymer.

Still another object of the invention is to provide improvements in treads wherein the wear surfaces of the treads are of relatively soft, synthetic, elastomer polymer having strips of a harder, more rigid, synthetic polymer inlaid in the wear surfaces of the treads or shoes.

The foregoing objects of the invention together with other objects and advantages hereafter set forth, will be attained by the invention hereafter described. Briefly, the tread surface is formed on a molded, elastomer polymer body. In treads on tank shoes or cleats and the like, the synthetic polymer body may be formed on a face of a metal plate having on the opposite face a threaded shank. The threaded shank is utilized to couple the shoe or cleat on an endless track of a track-driven vehicle in the conventional manner.

The tread surfaces of the synthetic elastomer body have therein a plurality of transverse grooves in which are inlaid transversely-extending strips of a harder, more rigid, synthetic polymer. The purpose of these strips is to provide a series of spaced, hard, wear-resistant surfaces which give the tread surfaces of the shoe or cleat a better overall tread support than would be the case if the wear surfaces were made entirely of the softer, less wear-resistant, elastomer polymer. At the same time, the road-gripping qualities of the wear surfaces of the shoes or cleats is retained inasmuch as the portions of the wear surface in front of, between and to the rear of the harder polymer strips comprise the softer synthetic polymer. The elastomer polymers which have been found most useful for purposes of the invention are hard synthetic polyurethane rubber for the wear-resistant strips and softer synthetic polyurethane rubber for the remainder of the molded rubber portion of the shoe.

Preferred embodiments of the invention are illustrated in the drawings wherein:

FIG. 1 is a perspective view of an armored tank utilizing a pair of endless tracks as the propulsion means;

FIG. 2 is a perspective view of the preferred embodiment of the shoe or cleat of the invention;

FIG. 3 is a bottom plan view of said shoe or cleat;

FIG. 4 is an end elevation of said shoe or cleat;

FIG. 5 is a cross-sectional view taken on section line 5—5 of FIG. 3;

FIG. 6 is a front elevation of said embodiment;

FIG. 7 is a sectional view taken on section line 7—7 of FIG. 3;

FIG. 8 is a top plan view of said embodiment; and

FIG. 9 is a cross section of the tread surface of a vehicle tire embodying a tread surface of the invention.

Referring to the drawings, there is shown in FIG. 1 an armored tank 1 which is propelled by a pair of endless tracks 2, 3. The endless tracks are driven in the usual manner by drive wheel 4 mechanically coupled to a motor inside the armored tank. The endless tracks travel over idler wheels 5–9, idler wheels 5–8 constituting the wheels upon which the body of the armored tank is supported. The endless tracks 2, 3 comprise a series of known, linked metal sections (not shown). A shoe or cleat 10 is attached to the outer faces of each of the sections, which shoes or cleats comprise the ground or road-contacting surfaces for the endless track. The shoes or treads 10 illustrated in the drawing comprise a main body of synthetic, molded polymer 11, preferably molded polyurethane. The molded body 11 comprises a bottom face or tread surface 12 having upwardly-sloping sides 13, 14 on opposite sides thereof. The forepart 15 of the face 12 also slopes upwardly.

The front edge or wall of the body 11 is a rearwardly-sloping wall 16 having upwardly and rearwardly-sloping corners 17, 18. The front corners of the sloping sides 13, 14 may comprise triangular corner sections 19, 20. The rear wall 21 of the body 11 is a V-shaped wall extending transversely across the rear shoe. The transverse mid-section of the rear wall 21 has a heel 22 extending rearwardly therefrom. The heel 22 has the bottom face or surface flush with the bottom wear surface 12 and is integrally molded therewith. The rear wall 23 of heel 22 is a V-shaped wall.

The upper portion 24 of the molded body 11 has a cavity 25. The cavity 25 is essentially rectangular in outline, with rounded corners and a substantially trapezoidal segment 26 extending from the mid-section of the rear wall of the cavity 25 at the point corresponding with the heel 22.

The cavity 25 accommodates a similarly shaped, metal, mounting plate 27. A threaded shank or shaft 28 is fixedly mounted near or at the mid-point of the plate 27 and extends outwardly at right angles to the outer face of the plate 27. The threaded shank or shaft 28 may be secured on the plate 27 by any suitable means. In the illustrated case, the shank or shaft 28 has a stepped down segment 29 which extends through a hole 30 in the plate 27. The projecting end of the segment 30 may be bent over in rivet-like fashion to provide a secure attachment of the shank or shaft 28 on the plate 27.

The plate 27 is tightly secured in the cavity 25 of the molded body 11 in any suitable manner. In the illustrated case, the plate 27 is held in the cavity 25 as a result of molding and curing the body 11 on the plate 27, whereby the plate and body become adhered.

The bottom, wear face 12 of the molded body 11 has a series of transverse, parallel grooves 31 extending across the entire width of the face 12 and a portion of the sloping walls 13, 14, the vertical end walls 32, 33 being located inwardly of the side walls 34, 35 of the molded body 11. In each of the grooves 31 there is provided a hard, wear-resistant strip 36 made of a hard, wear-resistant synthetic, moldable polymer, such as a hard polyurethane. The bottom wear edges 37 of the strips 36 lie flush with the bottom, wear face 12 of the molded body 11. Similarly, the sloping wear edges 38, 39 of strips 36 lie flush with the faces of the sloping sides 13, 14.

FIG. 9 shows a fragment of a tire of usual tire construction but embodying a tread surface of the invention. The tire may be a pneumatic tire or a nonpneumatic tire, the latter often being called solid rubber tires. The tire tread portion 50 is molded with the usual tire cording 51. The tread surface is made of a flexible, soft elastomer (e.g., soft polyurethane) as aforedescribed and has a plurality of transverse grooves 52 which may be straight, curved, zig zag, etc. Hard elastomer strips (e.g., hard polyurethane) as aforedescribed are provided in the grooves in the manner aforedescribed. The tread surface may have molded or cut therein one or more circumferential tread grooves 54 which may be straight, zig zag, curvately undulating, etc.

In making tires, the soft polyurethane is formed in a tire mold and may have the usual cording or other reinforcement embedded therein. For cleats, as illustrated, the soft polyurethane is molded with the plate 25 positioned in the mold. The curing provides a secure bond between the cured soft polyurethane body and the plate.

Polyurethane prepolymers are commercially available to provide cured polyurethanes of the hard and soft variety. The soft polyurethanes used in the invention preferably have a Durometer hardness in the range of 50–90 Shore A while the hard polyurethanes have a much higher hardness, e.g., a preferred Durometer hardness in the range of 45–85 Shore D. Other elastomer compositions should provide a similar hardness relationship.

One method for manufacture of the cleats or shoes herein described is as follows. The molded body 11 is molded with a soft polyurethane having road-gripping qualities. The mold is shaped so that the transverse grooves 31 are formed in the molded product. The soft polyurethane is vulcanized in the mold with the plate 27 in the mold so as to form and vulcanize the body 11 about plate 27. The plate 27 may be positioned in the mold so that the outer face 40 of the plate 27 is covered by a thin layer of vulcanized rubber 41 to protect the outer face 40 against corrosion and to aid in holding plate 27 and body 11 together as a unit.

The grooves 31 may then be filled with a hard, wear-resistant elastomer, such as hard polyurethane rubber prepolymer composition, which includes a polymerization catalyst, and which is vulcanized and further polymerized after the prepolymer composition is placed in the grooves of the molded body 11. The vulcanization and further polymerization not only hardens the hard polyurethane into a vulcanized, hard polyurethane rubber, but also provides a vulcanized bond between the walls of the grooves 31 and the vulcanized, hard polyurethane rubber used to make the wear-resistant strips 36.

A preferred mode of manufacture, however, is one in which the flexible, soft elastomer molded body 11 and hard elastomer molded strips 36 are cure-finished together to give a homogeneous, vulcanized bond locking strips 36 in place in the body 11. In this case, for example, the soft polyurethane is cast in a mold with transverse slots formed in the soft polyurethane. The curing process is begun. When the soft polyurethane gels sufficiently so that the walls of the slots are self-sustaining, the hard polyurethane composition is poured into the slots. The completion of the curing of soft polyurethane and the curing of the hard polyurethane proceed together. This results in a cohesive, vulcanized bond between the soft and hard polyurethanes.

It is also possible to use, instead of wet or liquid polyurethane compositions, systems which are essentially dry and in which the polyurethane is molded under pressure from an initial form comprising dry particles of the polyurethanes.

The invention is hereby claimed as follows:

1. A vehicle tread member comprising an elastomer body having a tread surface of a relatively soft, flexible, polyurethane elastomer having a Durometer hardness in the range of about 50 to 95 Shore A, said tread surface having a plurality of transverse grooves therein, and strips of a hard polyurethane elastomer having a Durometer hardness of 45 to 85 Shore D secured in said grooves and forming a part of said tread surface.

2. A tread member as claimed in claim 1 wherein said tread member is an elastomer tire.

3. A tread member as claimed in claim 1 wherein said tread member is a cleat of an endless track vehicle.

4. A tread member as claimed in claim 1 wherein said strips are vulcanized in said grooves by the co-curing of said soft and hard polyurethanes.

5. A tread member as claimed in claim 1 wherein said tread member is a cleat of an endless track vehicle, said cleat having a metal plate with a threaded shank fixedly mounted thereon and extending from one face of said plate, and said elastomer body being bonded to the opposite face of said plate.

6. A tread member comprising a plate, a shank projecting outwardly from one face of said plate, an elastomer body molded about said plate with a thick layer of said body covering the opposite face of said plate, said layer being a relatively soft, flexible, polyurethane elastomer having a Durometer hardness in the range of about 50 to 95 Shore A, the outer surface of which is the tread surface of said tread member, said tread surface having a plurality of grooves therein, and strips of a hard polyurethane elastomer having a Durometer hardness of 45 to 85 Shore D secured in said grooves and forming a part of said tread surface.

References Cited by the Examiner

UNITED STATES PATENTS

| | | | |
|---|---|---|---|
| 1,948,311 | 2/1934 | Orr | 156—114 |
| 2,207,098 | 7/1940 | Maynard | 156—114 X |
| 2,369,130 | 2/1945 | Benson | 305—35 |
| 3,558,922 | 7/1951 | Bechman | 305—35 |
| 2,686,697 | 8/1954 | Baker | 305—35 |
| 2,865,054 | 12/1958 | Constantakis | 156—114 |
| 2,902,072 | 9/1959 | Reuter | 152—330 |
| 2,917,347 | 12/1959 | Reuter | 305—38 |
| 3,057,389 | 10/1962 | Dubetz | 152—210 |
| 3,078,901 | 2/1963 | Iaquinta | 152—210 |

FOREIGN PATENTS

| | | |
|---|---|---|
| 739,577 | 9/1943 | Germany. |
| 10,948 | of 1908 | Great Britain. |

A. HARRY LEVY, *Primary Examiner.*

BENJAMIN HERSH, *Examiner.*

R. J. JOHNSON, *Assistant Examiner.*